(12) United States Patent
Okamoto et al.

(10) Patent No.: US 8,444,220 B2
(45) Date of Patent: May 21, 2013

(54) VEHICLE SEAT

(75) Inventors: Masafumi Okamoto, Hiroshima (JP);
Ryota Okimoto, Hiroshima (JP)

(73) Assignee: Delta Kogyo Co., Ltd. (JP)

( * ) Notice: Subject to any disclaimer, the term of this patent is extended or adjusted under 35 U.S.C. 154(b) by 379 days.

(21) Appl. No.: 12/939,352

(22) Filed: Nov. 4, 2010

(65) Prior Publication Data
US 2011/0121623 A1    May 26, 2011

(30) Foreign Application Priority Data

Nov. 20, 2009  (JP) .................................. 2009-264525

(51) Int. Cl.
*B60N 2/42*    (2006.01)
*B60R 21/00*   (2006.01)

(52) U.S. Cl.
USPC ..................................................... 297/216.14

(58) Field of Classification Search
USPC ........................................ 297/216.13, 216.14
See application file for complete search history.

(56) References Cited

U.S. PATENT DOCUMENTS

| | | | |
|---|---|---|---|
| 6,022,074 A | 2/2000 | Swedenklef | |
| 6,062,642 A | 5/2000 | Sinnhuber et al. | |
| 2002/0030392 A1* | 3/2002 | Kitagawa | 297/216.13 |
| 2005/0077763 A1* | 4/2005 | Kawashima | 297/216.14 |

FOREIGN PATENT DOCUMENTS

| | | |
|---|---|---|
| GB | 2283163 | 5/1995 |
| JP | 7-1842 | 1/1995 |

* cited by examiner

*Primary Examiner* — Milton Nelson, Jr.
(74) *Attorney, Agent, or Firm* — Gerald E. Hespos; Michael J. Porco; Matthew T. Hespos

(57) ABSTRACT

A vehicle seat has a back frame, an elastic member interconnecting side supports of the back frame, a movable member on the elastic member, and a restriction on the back frame. The movable member and the restriction engage each other in a first mode when a rearward load on the elastic member is less than a given value and are released from one another in a second mode when the load on the elastic member equals or exceeds the given value. The restriction restricts a rearward movement of the movable member in the first mode to limit rearward bending of the elastic member. Rearward movement of the movable member is permitted in the second mode to release the limitation on bending of the elastic member. Thus, the vehicle seat protects an occupant's neck during a rear collision.

4 Claims, 8 Drawing Sheets

VEHICLE SEAT

BACKGROUND OF THE INVENTION

1. Field of the Invention

The present invention relates to a vehicle seat.

2. Description of the Related Art

Heretofore, there has been known a vehicle seat which comprises a headrest, and a seat back having thereinside a back frame for supporting the headrest.

For example, Japanese Utility Model Laid-Open Publication No. 7-1842 discloses a vehicle seat which comprises an impact pressure-receiving frame and a headrest-supporting frame each provided on a back frame. The impact pressure-receiving frame has a lower end rotatably attached to a lower portion of the back frame. The headrest-supporting frame has a vertically central portion rotatably attached to an upper portion of the back frame, and a lower end connected to an upper end of the impact pressure-receiving frame.

In this vehicle seat, the headrest-supporting frame is adapted to be rotated in a direction causing an upper end thereof to be moved frontwardly in response to the impact pressure-receiving frame being inclined rearwardly. Thus, when the impact pressure-receiving frame is inclined rearwardly while being pressed by an occupant during a vehicle rear collision, the headrest supported by the upper end of the headrest-supporting frame is moved frontwardly in response to the inclination of the impact pressure-receiving frame. Thus, it becomes possible to reduce a distance between the headrest and a head of the occupant so as to protect a neck region of the occupant.

However, due to the mechanism in which two frames consisting of the impact pressure-receiving frame and the headrest-supporting frame are provided on the back frame, wherein the headrest-supporting frame and the impact pressure-receiving frame are operably coupled, the vehicle seat disclosed in the above Patent Document has a problem that a seat structure becomes complicated.

SUMMARY OF THE INVENTION

In view of the above circumstances, it is an object of the present invention to provide a vehicle seat capable of adequately protecting an occupant's neck region during a rear collision, with a simple structure.

In order to achieve the above object, the present invention provides a vehicle seat which comprises: a headrest; a seat back having thereinside a back frame which includes an upper frame adapted to support the headrest, and a pair of side frames disposed on respective ones of right and left sides of the upper frame; an elastic member extending in a widthwise direction of the vehicle seat to interconnect the pair of side frames; a movable member provided on the elastic member; and a restriction member provided on the back frame and engageable with the movable member, wherein the movable member and the restriction member are adapted, when a rearward load applied to the elastic member is less than a predetermined given value, to be placed in a first mode where the restriction member and the movable member are engaged with each other, and, when the load applied to the elastic member becomes equal to or greater than the given value, to achieve a transition to a second mode where the engagement between the restriction member and the movable member is released, and wherein, in the first mode, a rearward movement of the movable member is restricted by the restriction member, so that a rearward bending amount of the elastic member is limited, and, in the second mode, the rearward movement of the movable member is permitted, so that the limitation on the bending amount of the elastic member is released.

BRIEF DESCRIPTION OF DRAWINGS

FIGS. 6A to 6C illustrate a movement of the back frame, wherein FIG. 6A, FIG. 6B and FIG. 6C are a top plan sectional view in a no-load state, a top plan sectional view in a seated state, and a top plan sectional view during a rear collision, respectively.

DETAILED DESCRIPTION OF THE PREFERRED EMBODIMENTS

With reference to the drawings, the preferred embodiment of the present invention will now be described.

Figure 1:
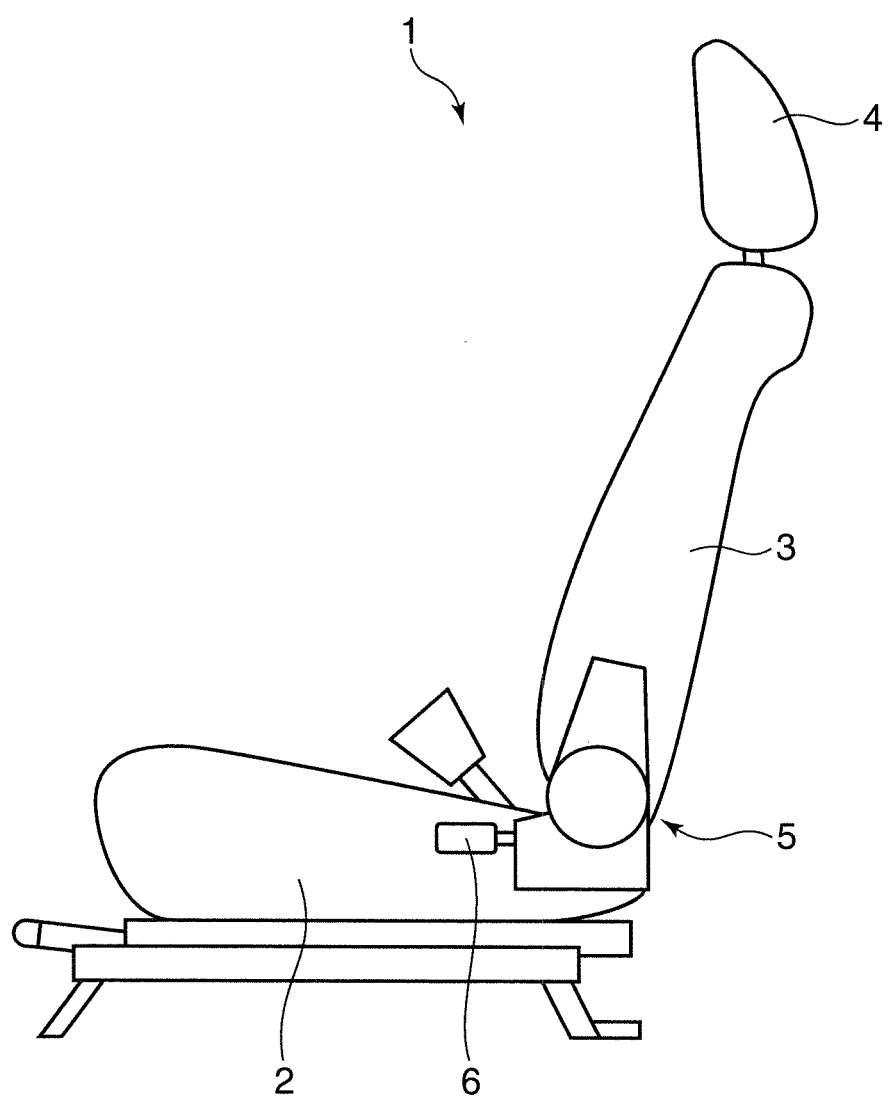
FIG. 1 is a side view of a vehicle seat according to one embodiment of the present invention.

As shown in FIG. 1, a vehicle seat 1 of this embodiment comprises a seat cushion 2, a seat back 3 provided to be inclinable (reclinable) in an frontward-rearward direction of a vehicle with respect to the seat cushion 2, a headrest 4 adapted to be attached to an upper end of the seat back 3, and a pair of right and left reclining mechanisms 5 (see FIGS. 2 and 3) coupling the seat cushion 2 and the seat back 3 together and for adjusting an inclination angle of the seat back 3 with respect to the seat cushion 2.

The pair of right and left reclining mechanisms 5 are operably coupled together by a coupling shaft 7. Further, one of the reclining mechanisms 5 is provided with a manual operation lever 6. An occupant can manually operate the manual operation lever 6 to simultaneously drive the pair of right and left reclining mechanisms 5 coupled by the coupling shaft 7 to adjust the inclination angle of the seat back 3 with respect to the seat cushion 2.

The seat back 3 has thereinside a back frame 10 (see FIGS. 2 and 3) adapted to support the headrest 4.

The back frame 10 includes a generally inverted U-shaped upper frame 11, a pair of right and left side frames 12 attached to the upper frame 11 to extend downwardly from respective ones of right and left lower ends of the upper frame 11, and a lower frame 13 interconnecting respective lower ends of the side frames 12.

The upper frame 11 is provided with a pair of right and left headrest support portions 11a for allowing respective ones of a pair of non-illustrated support rods of the headrest 4 to be inserted thereinto. Under a condition that the support rods are inserted in respective ones of the headrest support portions 11a, the headrest 4 is supported by the upper frame 11.

Three spring-fixing pieces 14 are attached to each of the side frames 12 at respective positions located along an upward-downward direction, by welding or the like.

A spring member 19 is provided between the pair of right and left side frames 12 to extend in a widthwise direction of the vehicle seat 1 (a rightward-leftward direction of the vehicle) and interconnect the side frames 12. Further, two spring members 20A, 20B are provided at positions each apart downwardly from the spring member 19 by a given distance to interconnect the side frames 12 in the same manner as that in the spring member 19, wherein the spring members 20A, 20B are arranged in spaced-apart relation in the upward-downward direction. Right and left ends of each of the spring members 19, 20A, 20B are fixed to corresponding ones of the spring-fixing pieces 14 of the side frames 12.

In this embodiment, an elastic member 20 (a member to which an after-mentioned movable member 30 is attached) is made up of the lower two spring members 20A, 20B. In the following description, when the lower two spring members 20A, 20B are collectively described, they will be referred to simply as "elastic member 20" on a case-by-case basis.

Each of the spring members 19, 20A, 20B is formed in a wave-line shape composed of a series of S shapes. Each of the spring members 19, 20A, 20B is adapted to support an upper body of an occupant seated in the vehicle seat 1, by a restoring force resulting from an elastic deformation. More specifically, when a rearward load from the occupant is applied to the spring members 19, 20A, 20B, these spring members 19, 20A, 20B are bent (elastically deformed) in such a manner that a central portion 22 of each thereof is displaced rearwardly, and the upper body of the occupant is supported by a restoring force generated along with the bending deformation. Among the spring members 19, 20A, 20B, the upper spring member 19 is adapted to support a central area of a back of the occupant, and the lower two spring members 20A, 20B (elastic member 20) are adapted to support a lumbar area of the occupant.

Each of the side frames 12 has a lower end formed with a circular-shaped opening. The openings are inserted with respective ones of opposite ends of the coupling shaft 7 connected to the right and left reclining mechanisms 5.

Although not illustrated in detail, each of the reclining mechanisms 5 couples the back frame 10 of the seat back 3 and a non-illustrated cushion frame of the seat cushion 2 together. The reclining mechanism 5 comprises two brackets attached to respective ones of the back frame 10 and the cushion frame, a gear unit connecting the brackets together in a relatively rotatable manner, and a shaft member for manually operating the gear unit. The manual operation lever 6 is attached to a distal end of the shaft member of one of the reclining mechanisms 5. The shaft member is adapted, according to a manual operation of the manual operation lever 6, to drive the gear unit so as to relatively rotate the brackets. This makes it possible to adjust the inclination angle of the back frame 10 with respect to the cushion frame.

Figure 2:
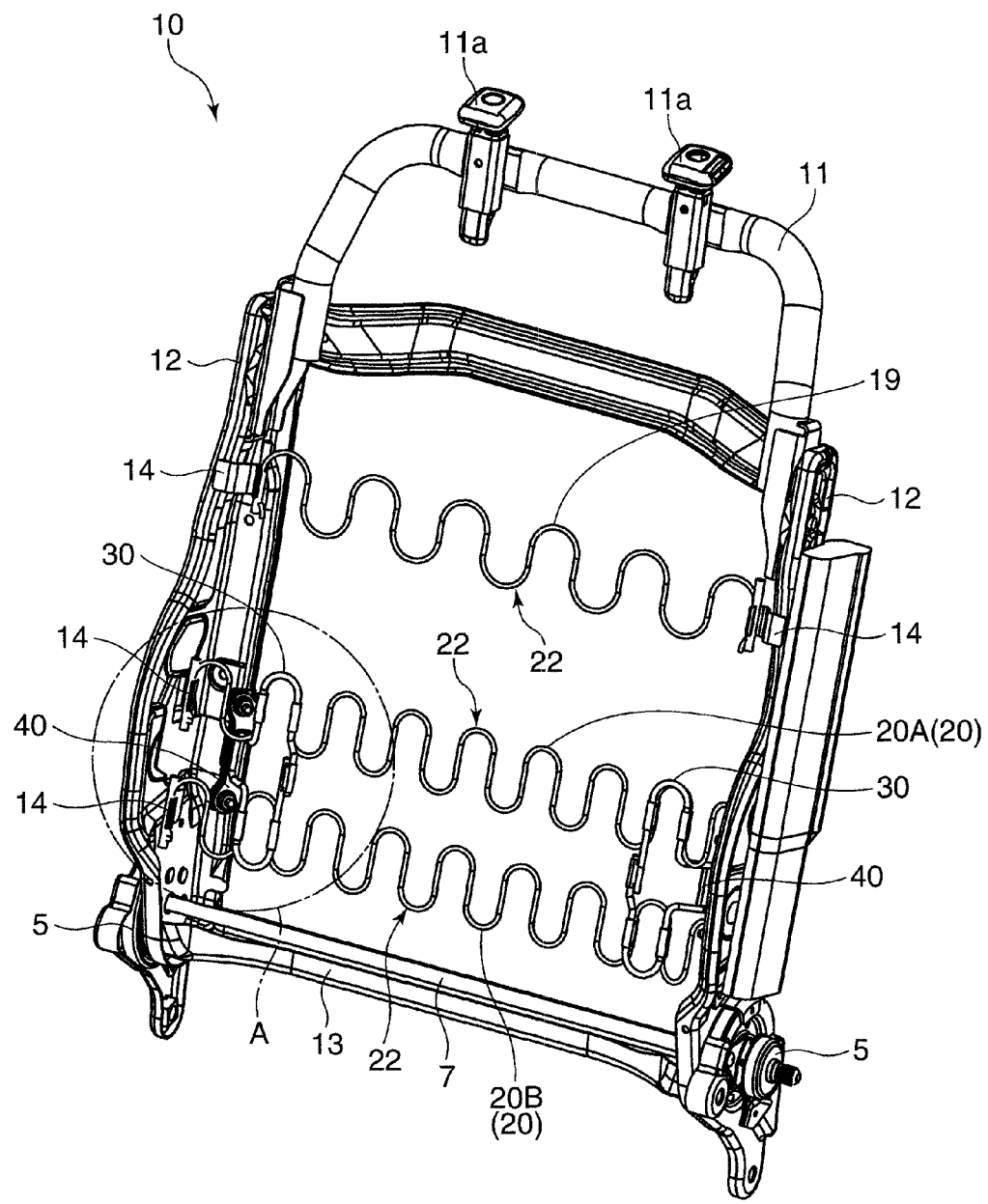
FIG. 2 is a perspective view of a back frame of the vehicle seat.
Figure 3:
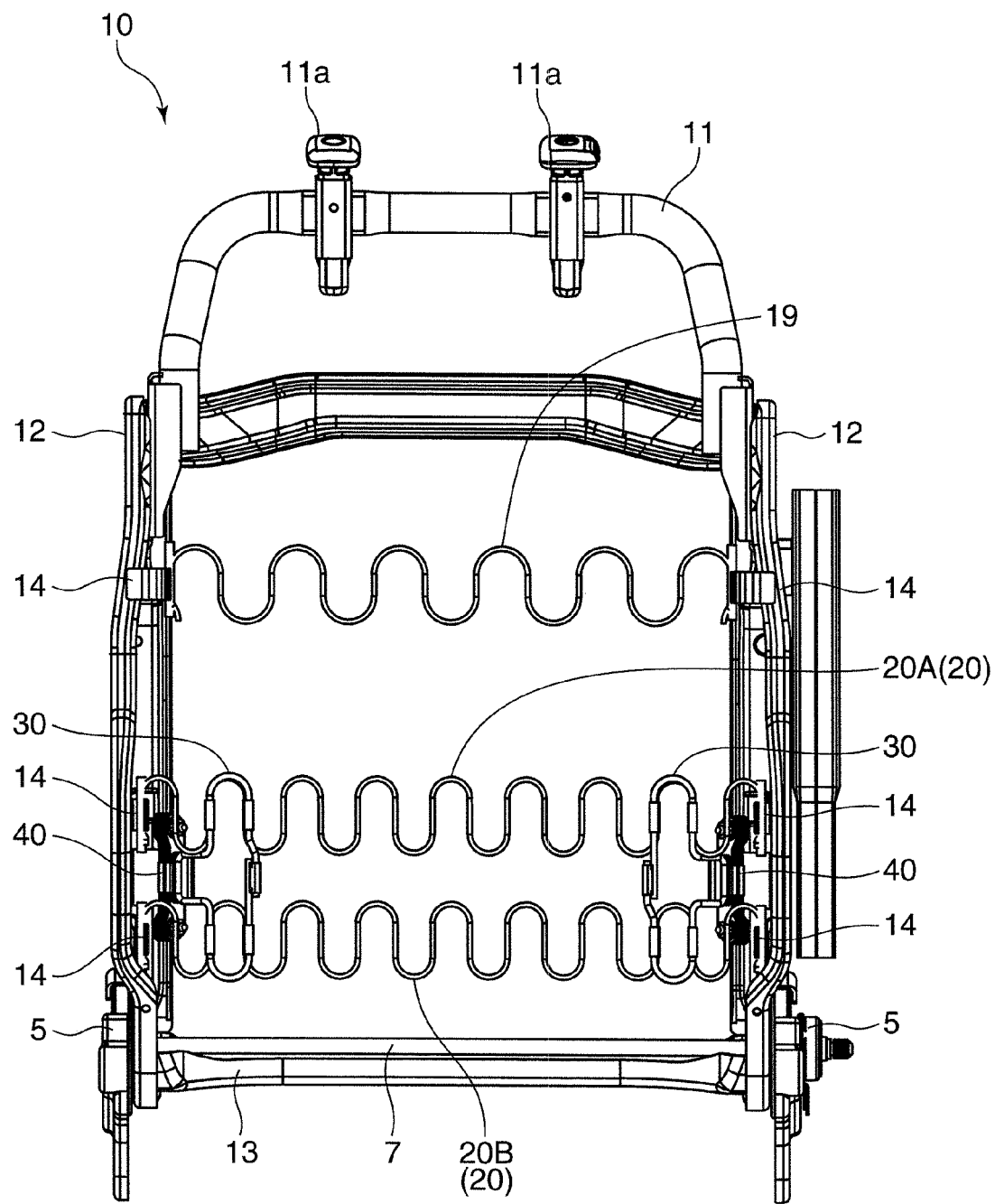
FIG. 3 is a front view of the back frame.

As shown in FIGS. 2 and 3, the lower two spring members 20A, 20B making up the elastic member 20 are provided with a pair of right and left movable members 30. Each of the movable members 30 is provided commonly with respect to the two spring members 20A, 20B, and attached to the spring members 20A, 20B to couple them together in the upward-downward direction. Correspondingly, the back frame 10 is provided with a pair of right and left restriction members 40 each adapted to be engaged with a corresponding one of the movable members 30 to restrict a rearward movement of the corresponding movable member 30.

The movable member 30 and the restriction member 40 on each of the right and left sides are adapted to be shifted between a first mode and a second mode as described below, depending on a level of load applied to the elastic member 20 (spring members 20A, 20B).

Figure 6A:
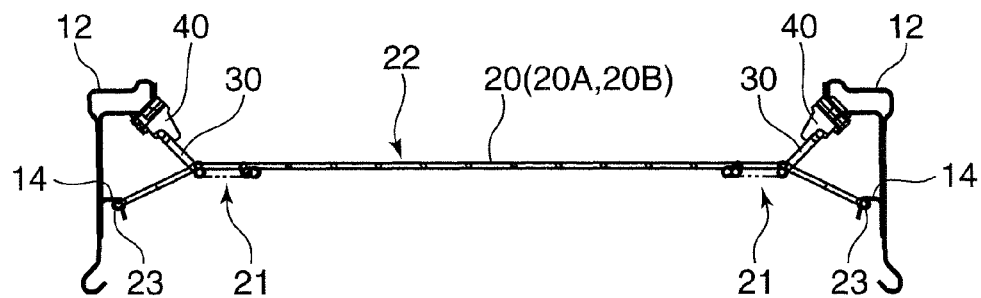
Figure 6B:
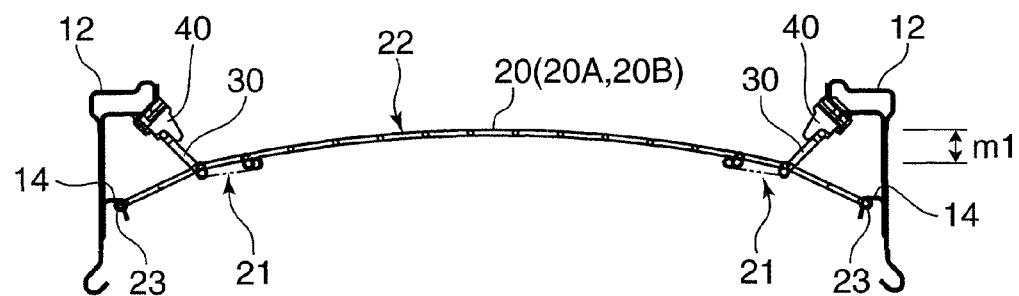

The first mode is a mode in which the movable member 30 and the restriction member 40 are placed during a normal state, such as a no-load state (unseated state) or a seated state, where a rearward load applied to the elastic member 20 (spring members 20A, 20B) is less than a predetermined given value. As shown in FIGS. 6A and 6B, in the first mode, the movable member 30 and the restriction member 40 are engaged with each other, whereby the rearward movement of the movable member 30 is restricted, so that a rearward bending amount of the elastic member 20 is limited (see the bending amount m1 in FIG. 6B). In the first mode, in each of the spring members 20A, 20B as the elastic member 20, an end-adjacent region 21 which is a region adjacent to each of right and left ends 23 thereof (a region between the central portion 22 and each of the right and left ends 23), behaves like a fixed end.

Figure 6C:
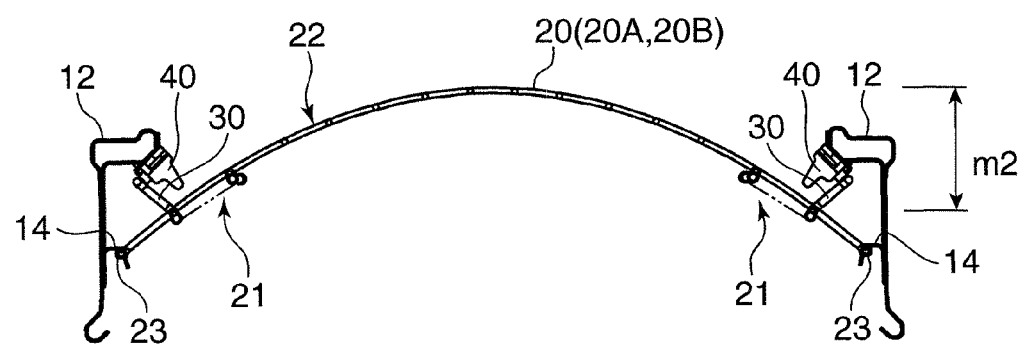

The second mode is a mode in which the movable member 30 and the restriction member 40 are placed, when the load applied to the elastic member 20 (spring members 20A, 20B) becomes equal to or greater than the given value, for example, during a vehicle rear collision. As shown in FIG. 6C, in the second mode, the engagement between the restriction member 40 and the movable member 30 is released, whereby the rearward movement of the movable member 30 is permitted, so that the elastic member 20 is permitted to be largely bent rearwardly (see the bending amount m2 in FIG. 6C). In the second mode, in each of the spring members 20A, 20B as the elastic member 20, each of the right and left ends 23 thereof functions as a fixed end.

Figure 7:
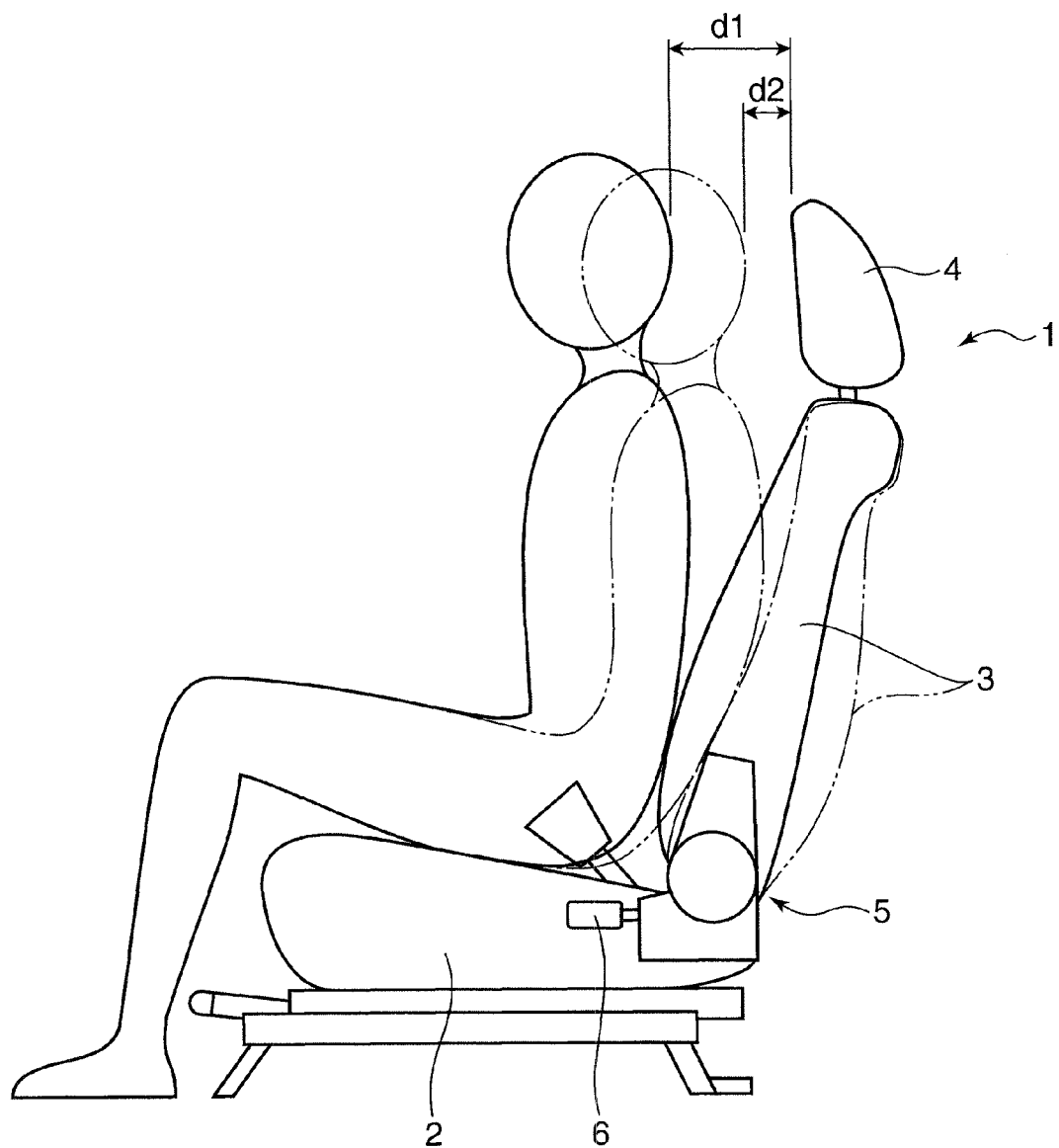
FIG. 7 is a side view showing a positional relationship between an occupant and a seat back.

In the above vehicle seat, during a normal state, such as a no-load state (unseated state) or a seated state, where the load applied to the elastic member 20 is less than the given value, an excessive rearward bending of the elastic member 20 is suppressed by the movable members 30 and the restriction members 40, so that an upper body of a seated occupant is maintained in an adequate posture as indicated by the solid line in FIG. 7.

On the other hand, when the load applied to the elastic member 20 becomes equal to or greater than the given value, for example, during a vehicle rear collision, the restriction on the bending amount of the elastic member 20 by the movable members 30 and the restriction members 40 is released, so that the elastic member 20 is allowed to be largely bent rearwardly. Thus, as indicated by the two-dot chain line in FIG. 7, the occupant's upper body is deeply sunk into the seat back 3 to reduce a distance between an occupant's head and the headrest 4 (d1→d2), so that a load to be imposed on an occupant's neck region is reduced.

For example, the given value is set to a value which is sufficiently greater than a load to be applied to the elastic member 20 in a seated state, and less than a load to be applied to the elastic member 20 during a rear collision.

A structure of each of the movable member 30 and the restriction member 40 will be specifically described below. Although FIGS. 4 and 5 enlargedly illustrate the movable member 30 and the restriction member 40 on the left side in FIG. 2, the movable member 30 and the restriction member 40 on the right side are structurally the same as corresponding ones of the members on the left side.

Figure 4:
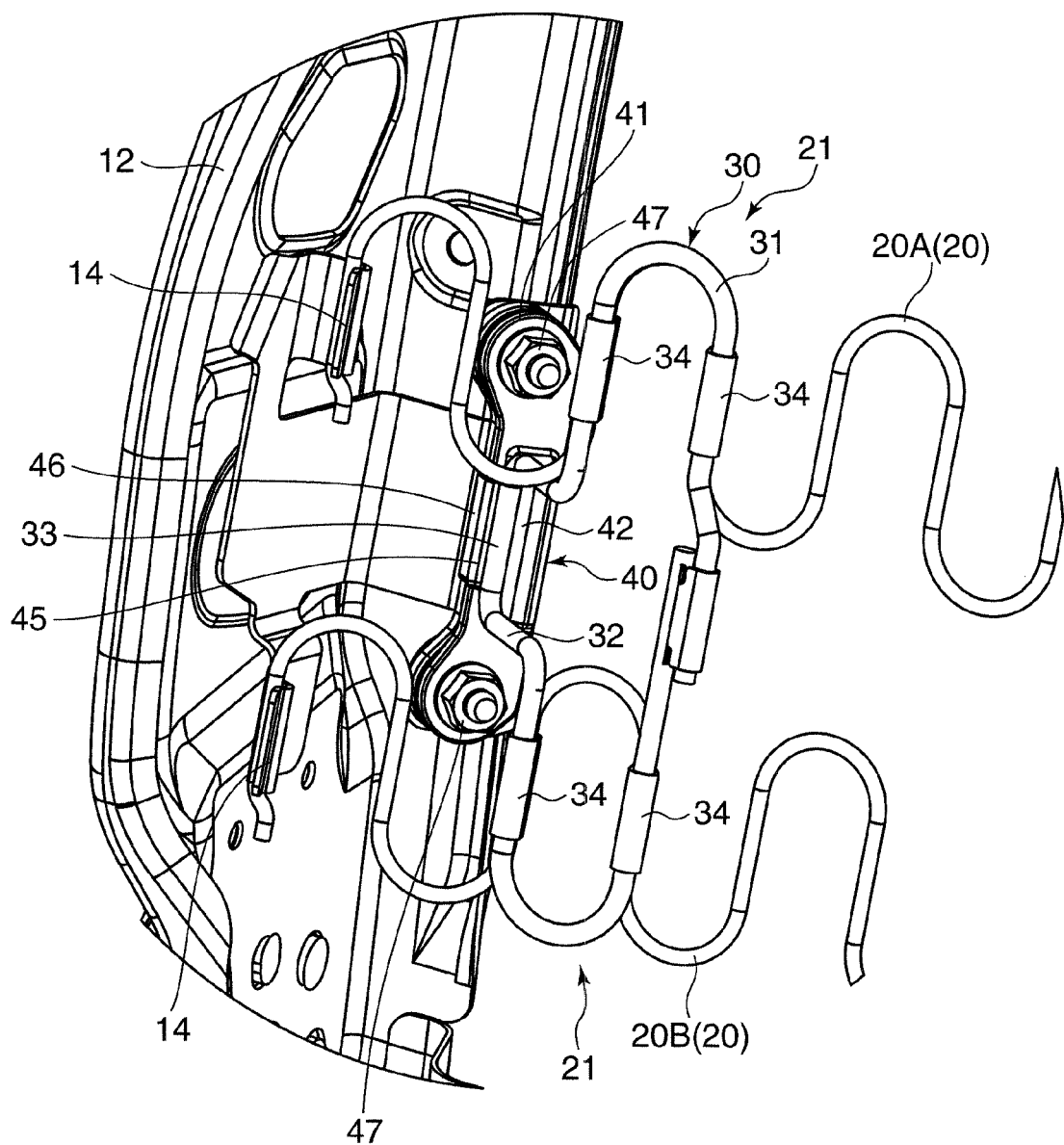
FIG. 4 is an enlarged perspective view of the area A in FIG. 2.
Figure 5:
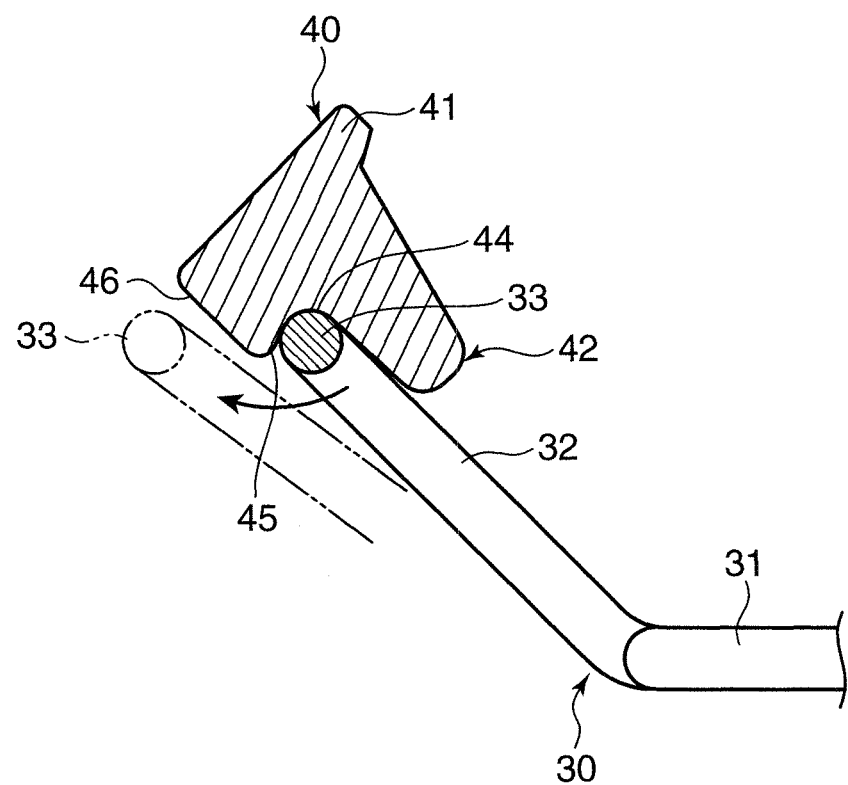
FIG. 5 is a top plan sectional view of a movable member and a restriction member, when viewed from above.

As shown FIGS. 4 and 5, the movable member 30 integrally includes a base portion 31 and a protruding portion 32. In this embodiment, the movable member 30 is formed by subjecting a rod-shaped member to a bending process.

The base portion 31 is provided in a height range over the pair of upper and lower spring members 20A, 20B making up the elastic member 20, and attached to the spring members 20A, 20B to interconnect the respective end-adjacent regions 21 of the spring members 20A, 20B together in the upward-downward direction. The base portion 31 is formed to have a given width in an extension direction of each of the spring members 20A, 20B (in the widthwise direction of the vehicle seat).

The base portion 31 is fastened to the spring members 20A, 20B through four fastening clips 34 provided at upper right, upper left, lower right and lower left positions. More specifically, the fastening clips 34 are provided at two widthwise spaced-apart positions of the spring member 20A and at two widthwise spaced-apart positions of the spring member 20B, respectively, and the base member 31 is fastened to the spring members 20A, 20B through the total four fastening clips 34.

In top view (see FIG. 5), the protruding portion 32 is formed to protrude obliquely rearwardly and outwardly (in FIG. 5, obliquely upwardly and leftwardly) from a outer end (in FIG. 5, a left end) of the base portion 31 in the widthwise direction of the seat (vehicle seat 1). In other words, the base portion 31 and the protruding portion 32 intersect each other in directions allowing an obtuse angle to be defined therebetween in top view.

In the above vehicle seat, when a rearward load is applied from an occupant to the elastic member 20 made up of spring members 20A, 20B, and the elastic member 20 is bent in such a manner that the central portion 22 thereof is displaced rearwardly, the base portion 31 is moved rearwardly along with the bending deformation, and changed to a posture where a rear surface thereof is oriented in a widthwise outward direction (see FIGS. 6B and 6C). According to this movement of the base portion 31, the protruding portion 32 is swingingly displaced in such a manner that a distal end 33 thereof is moved outwardly in the widthwise direction of the seat. In other words, the rearward bending deformation of the elastic member 20 is converted to the widthwise outward movement of the distal end 33 of the protruding portion 32.

As shown in FIGS. 2 to 4, the restriction member 40 is provided on each of the right and left side frames 12. As shown in FIGS. 4 and 5, the restriction member 40 integrally includes a fixed portion 41 and a receiving portion 42.

The fixed portion 41 is fixed to the side frame 12 through a bolt 47.

The receiving portion 42 is provided to protrude frontwardly from the fixed portion 41, and adapted to support the distal end 33 of the protruding portion 32 of the movable member 30 from a rear side thereof to restrict a rearward movement of the distal end 33.

More specifically, the receiving portion 42 has a concave section 44 with a shape capable of receiving therein the distal end 33 of the protruding portion 32, a convex section 45 provided on a outward side (in FIG. 5, a left side) in the widthwise direction of the seat with respect to the concave section 44 in continuous relation thereto, and an inclined-surface section 46 provided on the outward side with respect to the convex section 45. The concave section 44 is provided in a position where at least a part of the distal end 33 of the protruding portion 32 is brought into contact with the concave section 44 when a direction of the protruding portion 32 falls within a given range.

In the above vehicle seat 1, in the no-load state, i.e., when the rearward load applied to the elastic member 20 (spring members 20A, 20B) is "0", the distal end 33 of the protruding portion 32 of the movable member 30 is received in the concave section 44 of the restriction member 40. Thus, it becomes possible to maintain the first mode where the rearward movement of the movable member 30 is restricted by the restriction member 40.

Further, in the seated state, i.e., when the rearward load applied to the elastic member 20 is less than the given value, along with a rearward bending deformation of the elastic member 20, a force is applied to the movable member 30 in a direction causing the base portion 31 to be moved rearwardly and causing the distal end 33 of the protruding portion 32 to be moved outwardly in the widthwise direction of the seat. However, a force acting on the distal end 33 is relatively weak in the seated state, and thereby the distal end 33 of the protruding portion 32 cannot climb over the convex section 45 of the receiving portion 42, so that the distal end 33 is maintained in the state of being received in the concave section 44. Thus, the distal end 33 of the protruding portion 32 is restricted from being moved rearwardly and outwardly (outwardly in the widthwise direction of the seat), so that the first mode is maintained.

On the other hand, during a rear collision, i.e., when the rearward load applied to the elastic member 20 becomes equal to or greater than the given value, the force causing the distal end 33 of the protruding portion 32 to be moved outwardly in the widthwise direction of the seat is relatively strong, and thereby the distal end 33 of the protruding portion 32 is moved to climb over the convex section 45 of the receiving portion 42 and escape to a rearward and outward side with respect to the convex section 45. Thus, a rearward movement of the movable member 30 is permitted, so that a transition to the second mode is achieved.

Subsequently, when the rearward load caused by the rear collision is sufficiently reduced, the protruding portion 32 of the movable member 30 is returned to a position where it is supported by the receiving portion 42 (to an inside of the concave section 44), by a restoring force of the elastic member 20.

In the vehicle seat 1 according to the above embodiment, during a normal state, such as a no-load state or a seated state, where a rearward load applied to the elastic member 20 (spring members 20A, 20B) is less than a predetermined given value, the restriction member 40 and the movable member 30 are engaged with each other, so that a bending amount of the elastic member 20 is limited. Thus, an excessive rearward bending of the elastic member 20 is suppressed, so that an upper body of a seated occupant is maintained in an adequate posture. On the other hand, when the load applied to the elastic member 20 becomes equal to or greater than the given value, for example, during a rear collision, the engagement between the restriction member 40 and the movable member 30 is released, so that the elastic member 20 is allowed to be largely bent rearwardly. Thus, the occupant's upper body is deeply sunk into the seat back 3 to reduce a distance between an occupant's head and the headrest 4, so that a load to be imposed on an occupant's neck region is reduced. Therefore, in the above embodiment, it becomes possible to achieve a balance between maintaining of a posture of the occupant's upper body during the normal state, and protection of the occupant's neck region during a rear collision, with a simple structure in which the movable members 30 and the restriction members 40 are provided on the elastic member 20 (spring members 20A, 20B) and the back frame 10, respectively.

In the vehicle seat 1 according to the above embodiment, the movable member 30 has the base portion 31, and the protruding portion 32 protruding obliquely rearwardly and outwardly from the outer end of the base portion 31 in the widthwise direction of the seat. Thus, along with a rearward bending deformation of the elastic member 20, a force is applied to the movable member 30 in a direction causing the base portion 31 to be moved rearwardly and causing the distal end 33 of the protruding portion 32 to be moved outwardly in the widthwise direction of the seat. In this case, when the bending amount of the elastic member 20 is small, a force acting on the distal end 33 is weak, and thereby the distal end 33 of the protruding portion 32 is supported by the receiving portion 42 of the restriction member 40, so that it becomes possible to maintain the first mode where the rearward movement of the movable member 30 is restricted. On the other hand, when the bending amount of the elastic member 20 is increased, the force acting on the distal end 33 of the protruding portion 32 becomes strong, and thereby the distal end 33 is moved outside (disengaged from) the receiving portion 42, so that it becomes possible to achieve a transition to the second mode where the rearward movement of the movable member 30 is permitted. In this manner, the first mode is automatically shifted to the second mode according to the bending deformation of the elastic member 20, so that it becomes possible to eliminate a need for a shifting device for shifting between the first and second modes, so as to facilitate structural simplification.

In the above embodiment, the rearward movement of the movable member 30 is reliably restricted by receiving the distal end 33 of the protruding portion 32 in the concave section 44 of the receiving portion 42, so that it becomes possible to effectively prevent an unexpected transition from the first mode to the second mode during the normal state.

In the above embodiment, the distal end 33 of the protruding portion 32 is automatically returned to a position where it is supported by the receiving portion 42 (an inside of the concave section 44), by a restoring force of the elastic member 20 (spring members 20A, 20B), so that it become possible to eliminate a need for a return spring or the like, so as to further facilitate the structural simplification.

In the above embodiment, the movable member 30 is provided on each of the right and left sides of the pair of spring members 20A, 20B making up the elastic member 20, so that it become possible to provide a simple structure as compared with a structure in which the movable member 30 is provided on each of the spring members 20A, 20B separately.

Figure 8:
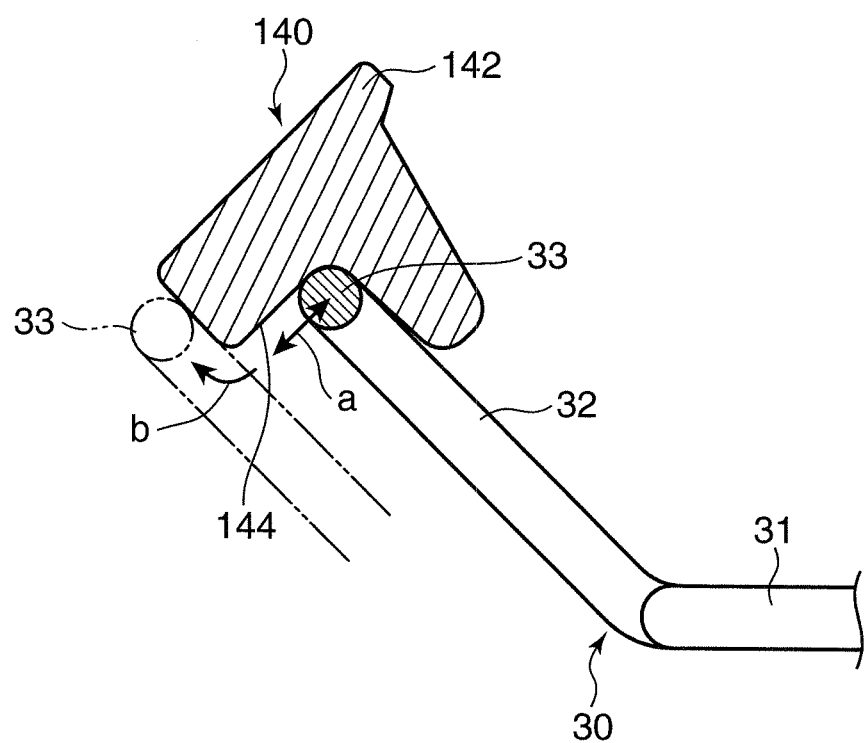
FIG. 8 is a schematic top plan sectional view showing a movable member and a restriction member in a modified embodiment.

As the restriction member 40, a structure as shown in FIG. 8 may be employed. In a restriction member 140 illustrated in FIG. 8, a receiving surface 144 of a receiving portion 142 thereof is formed as a flat surface. In this case, during the normal state including the seated state, the distal end 33 of the protruding portion 32 is supported by the receiving surface 144 while being slidingly moved (see the arrowed line a) on the receiving surface 144 in the rightward-leftward direction (the widthwise direction of the seat). On the other hand, during a rear collision, the distal end 33 of the protruding portion 32 is largely moved on the receiving surface 144 outwardly in the widthwise direction of the seat and disengaged from the receiving surface 144 (see the arrowed line b).

Further, the movable member 30 may be provided on each of the spring members 20A, 20B. Alternatively, the movable member 30 may be provided on only one of the spring members 20A, 20B.

Further, the movable member 30 is not limited to a type formed by subjecting a rod-shaped member to a bending process, but may be formed by subjecting a plate-shaped member to a folding process.

Lastly, features of the above vehicle seat and effects thereof will be summarized.

A vehicle seat comprises: a headrest; a seat back having thereinside a back frame which includes an upper frame adapted to support the headrest, and a pair of side frames disposed on respective ones of right and left sides of the upper frame; an elastic member extending in a widthwise direction of the vehicle seat to interconnect the pair of side frames; a movable member provided on the elastic member; and a restriction member provided on the back frame and engageable with the movable member. The movable member and the restriction member are adapted, when a rearward load applied to the elastic member is less than a predetermined given value, to be placed in a first mode where the restriction member and the movable member are engaged with each other, and, when the load applied to the elastic member becomes equal to or greater than the given value, to achieve a transition to a second mode where the engagement between the restriction member and the movable member is released. In the first mode, a rearward movement of the movable member is restricted by the restriction member, so that a rearward bending amount of the elastic member is limited, and, in the second mode, the rearward movement of the movable member is permitted, so that the limitation on the bending amount of the elastic member is released.

In the above vehicle seat, during a normal state, such as a no-load state or a seated state, where the rearward load applied to the elastic member is less than the given value, the restriction member and the movable member are engaged with each other, so that a bending amount of the elastic member 20 is limited. Thus, an excessive rearward bending of the elastic member is suppressed, so that an upper body of a seated occupant is maintained in an adequate posture. On the other hand, when the load applied to the elastic member becomes equal to or greater than the given value, for example, during a rear collision, the engagement between the restriction member and the movable member is released, so that the elastic member is allowed to be largely bent rearwardly. Thus, the occupant's upper body is deeply sunk into the seat back to reduce a distance between an occupant's head and the headrest, so that a load to be imposed on an occupant's neck region is reduced. Therefore, in the above vehicle seat, it becomes possible to achieve a balance between maintaining of a posture of the occupant's upper body during the normal state, and protection of the occupant's neck region during a rear collision, with a simple structure in which the movable member and the restriction member are provided on the elastic member and the back frame, respectively.

Preferably, in the above vehicle seat, the movable member has a base portion attached to the elastic member, and a protruding portion protruding obliquely rearwardly and outwardly from a outer end of the base portion in the widthwise direction of the vehicle seat, and the restriction member has a receiving portion capable of supporting a distal end of the protruding portion of the movable member from a rear side thereof. In the first mode, the rearward movement of the movable member is restricted in such a manner that the distal end of the protruding portion is supported by the receiving portion, and, in the second mode, the engagement between the movable member and the restriction member is released in such a manner that the protruding portion is moved outwardly in the widthwise direction of the vehicle seat beyond the receiving portion.

In this vehicle seat, the movable member has the base portion, and the protruding portion protruding obliquely rearwardly and outwardly from the outer end of the base portion in the widthwise direction of the vehicle seat. Thus, along with a rearward bending deformation of the elastic member, a force is applied to the movable member in a direction causing the base portion to be moved rearwardly and causing the distal end of the protruding portion to be moved outwardly in the widthwise direction of the vehicle seat. In this case, when the bending amount of the elastic member is small, a force acting on the distal end is weak, and thereby the distal end of the protruding portion is supported by the receiving portion of the restriction member, so that it becomes possible to maintain the first mode where the rearward movement of the movable member is restricted. On the other hand, when the bending amount of the elastic member is increased, the force acting on the distal end of the protruding portion becomes strong, and thereby the distal end is moved outside (disengaged from) the receiving portion, so that it becomes possible to achieve a transition to the second mode where the rearward movement of the movable member is permitted. In this manner, the first mode is automatically shifted to the second mode according to the bending deformation of the elastic member, so that it becomes possible to eliminate a need for a shifting device for shifting between the first and second modes, so as to facilitate structural simplification.

Preferably, in the above vehicle seat, the receiving portion of the restriction member has a concave section capable of receiving therein the distal end of the protruding portion of the movable member, and a convex section provided on a outward side in the widthwise direction of the vehicle seat with respect to the concave section in continuous relation thereto. In the first mode, the rearward movement of the movable member is restricted in such a manner that the distal end of the protruding portion is received in the concave section, and, in the second mode, the engagement between the movable member and the restriction member is released in such a manner that the distal end of the protruding portion received in the concave section is moved to climb over the convex section.

In this vehicle seat, the rearward movement of the movable member is reliably restricted by receiving the distal end of the protruding portion in the concave section of the receiving portion, so that it becomes possible to effectively prevent an unexpected transition from the first mode to the second mode during the normal state.

Preferably, in the above vehicle seat, the movable member is designed such that, after the engagement between the movable member and the restriction member is released, the distal end of the protruding portion is returned to a position where it is supported by the receiving portion, by a restoring force of the elastic member.

In this vehicle seat, the distal end of the protruding portion is automatically returned to a position where it is supported by the receiving portion, by a restoring force of the elastic member, so that it become possible to eliminate a need for a return spring or the like, so as to further facilitate the structural simplification.

Preferably, in the above vehicle seat, the elastic member is comprised of a plurality of spring members provided between the pair of side frames in spaced-apart relation in an upward-downward direction, and the movable member includes a right movable member provided in a vicinity of right ends of the plurality of spring members and a left movable member provided in a vicinity of left ends of the plurality of spring members, wherein each of the movable members is attached to the plurality of spring members to interconnect the plurality of spring members in the upward-downward direction.

This makes it possible to provide a simple structure as compared with a structure in which the movable member is provided on each of the spring members separately.

This application is based on Japanese patent application serial no. 2009-264525, filed in Japan Patent Office on Nov. 20, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle seat comprising:
a headrest;
a seat back having thereinside a back frame which includes an upper frame adapted to support the headrest, and a pair of side frames disposed on respective ones of right and left sides of the upper frame;
an elastic member extending in a widthwise direction of the vehicle seat to interconnect the pair of side frames;
a movable member provided on the elastic member, the movable member having a base portion attached to the elastic member, and a protruding portion protruding obliquely rearward and outward from an outer end of the base portion in a widthwise direction of the vehicle seat; and
a restriction member provided on the back frame and having a receiving portion capable of supporting a distal end of the protruding portion of the movable member from a rear side thereof,
wherein the movable member and the restriction member are adapted, when a rearward load applied to the elastic member is less than a predetermined given value, to be placed in a first mode where the restriction member and the movable member are engaged with each other, and, when the load applied to the elastic member becomes equal to or greater than the given value, to achieve a transition to a second mode where the engagement between the restriction member and the movable member is released,
and wherein, in the first mode, a rearward movement of the movable member is restricted by the restriction member, so that the distal end of the protruding portion is supported by the receiving portion and a rearward bending amount of the elastic member is limited, and, in the second mode, the engagement between the movable member and the restriction member is released in such a manner that the protruding portion is moved outward in the widthwise direction of the vehicle seat beyond the receiving portion and the rearward movement of the movable member is permitted, so that the limitation on the bending amount of the elastic member is released.

2. The vehicle seat as defined in claim 1, wherein:
the elastic member is comprised of a plurality of spring members provided between the pair of side frames in spaced-apart relation in an upward-downward direction; and
the movable member includes a right movable member provided in a vicinity of right ends of the plurality of spring members and a left movable member provided in a vicinity of left ends of the plurality of spring members, each of the movable members being attached to the plurality of spring members to interconnect the plurality of spring members in the upward-downward direction.

3. The vehicle seat as defined in claim 1, wherein the receiving portion of the restriction member has a concave section capable of receiving therein the distal end of the protruding portion of the movable member, and a convex section provided on a outward side in the widthwise direction of the vehicle seat with respect to the concave section in continuous relation thereto,
and wherein, in the first mode, the rearward movement of the movable member is restricted in such a manner that the distal end of the protruding portion is received in the concave section, and, in the second mode, the engagement between the movable member and the restriction member is released in such a manner that the distal end of the protruding portion received in the concave section is moved to climb over the convex section.

4. The vehicle seat as defined in claim 1, wherein the movable member is designed such that, after the engagement between the movable member and the restriction member is released, the distal end of the protruding portion is returned to a position where it is supported by the receiving portion, by a restoring force of the elastic member.

* * * * *